United States Patent [19]

Murakawa et al.

[11] Patent Number: 5,335,487
[45] Date of Patent: Aug. 9, 1994

[54] ENGINE SPEED CONTROL APPARATUS FOR A WORKING VEHICLE

[75] Inventors: Masatake Murakawa; Akira Minoura; Kazuaki Kurohara; Ryozo Imanishi; Nobuyuki Yamashita; Eriya Harada, all of Sakai, Japan

[73] Assignee: Kubota Corporation, Osaka, Japan

[21] Appl. No.: 26,368

[22] Filed: Mar. 4, 1993

[30] Foreign Application Priority Data

| Mar. 6, 1992 [JP] | Japan | 4-049444 |
| Jun. 25, 1992 [JP] | Japan | 4-167342 |
| Dec. 24, 1992 [JP] | Japan | 4-343041 |

[51] Int. Cl.$^5$ ............................. A01D 34/00
[52] U.S. Cl. ............................. 56/10.5; 56/10.8; 56/11.3; 56/11.8
[58] Field of Search ............. 56/10.5, 10.8, 10.9, 56/11.1, 11.2, 11.3, 11.8, 10.2 G, 10.2 H

[56] References Cited

U.S. PATENT DOCUMENTS

| 3,514,929 | 6/1970 | Cornish et al. | 56/10.2 G |
| 4,058,094 | 11/1977 | Moore | 123/356 |
| 4,967,544 | 11/1990 | Ziegler et al. | 56/10.2 G |
| 5,215,056 | 6/1993 | Harada et al. | 123/352 X |

*Primary Examiner*—Terry Lee Melius
*Attorney, Agent, or Firm*—Townsend & Townsend Khourie & Crew

[57] ABSTRACT

A rotating rate control apparatus for adjusting rotation of an engine of a working vehicle between a minimum rate and a maximum rate. The control apparatus has a first, a second and a third rotating rate adjusting devices. The first rotating rate adjusting device adjusts a basic rotating rate of the engine between the minimum rate and maximum rate. The second rotating rate adjusting device is shiftable between an ON position and an OFF position. The second rotating rate adjusting device is operable, when in the ON position, to set the engine to a predetermined rotating rate between the minimum rate and the maximum rate inclusive. The third rotating rate adjusting device is operable, when the second rotating rate adjusting device is in the OFF position, to adjust the rotating rate of the engine between the basic rotating rate adjusted by the first rotating rate adjusting device and the maximum rate.

19 Claims, 14 Drawing Sheets

ENGINE SPEED CONTROL APPARATUS FOR A WORKING VEHICLE

BACKGROUND OF THE INVENTION

1. Field of the Invention

The present invention relates to an engine speed control apparatus for adjusting a rotating rate of an engine of a working vehicle, such as a lawn mower.

2. Description of the Related Art

Generally, an accelerating structure of a working vehicle has only a hand accelerator device, or both a hand accelerator device and a foot accelerator device.

In the former, a hand accelerator lever retainable in a selected position is set to a high speed position (usually a top speed position) for an operational run, and to a suitable low speed position for a non-operational run.

In the latter, an accelerator pedal is depressed to control engine speed with a hand accelerator lever set to a high speed position for an operational run, and with the hand accelerator lever set to an idling position or a selected low speed position for a non-operational run.

In the former having only the hand accelerator device, the hand accelerator lever must be set to different positions for the operational run and non-operational run. Since the shifting operation is troublesome, the operator often drives the vehicle in a non-operational run while leaving the hand accelerator lever set to the high speed position, resulting in a wasteful consumption of fuel and producing loud engine noise.

In the latter having both the hand accelerator device and foot accelerator device, the working vehicle may be driven in a non-operational run with the same feeling as when driving an ordinary automobile since acceleration or deceleration is effected by an extent to which the accelerator pedal is depressed to select a running speed through a transmission. However, to start an operational run, the hand accelerator lever must be set to a high speed position. In this case, as in the former, the operational run and non-operational run require a troublesome operation to shift the hand accelerator device from one position to another to change engine speed.

SUMMARY OF THE INVENTION

The present invention has been made having regard to the state of the art noted above. An object of the invention, therefore, is to provide an accelerating structure of great utility for readily setting rotating rates suited to varied running conditions without requiring a troublesome speed changing operation even when an operational run and a non-operational run are frequently repeated, and for enabling the same speed setting as in the prior art, as necessary.

The above object is fulfilled, according to the present invention, by a rotating rate control apparatus for adjusting rotation of an engine of a working vehicle between a minimum rate and a maximum rate, comprising a first rotating rate adjusting device for adjusting a basic rotating rate of the engine between the minimum rate and the maximum rate; a second rotating rate adjusting device shiftable between an ON position and an OFF position, the second rotating rate adjusting device being operable, when in the ON position, to set the engine to a predetermined rotating rate between the minimum rate and the maximum rate inclusive; and a third rotating rate adjusting device operable, when the second rotating rate adjusting device is in the OFF position, to adjust the rotating rate of the engine between the basic rotating rate adjusted by the first rotating rate adjusting device and the maximum rate.

In the above construction, the second rotating rate adjusting device may be connected to a device for transmitting power from the engine to an accessory of the working vehicle, such as a mower unit, as shown in the embodiments of the present invention. Then, only by operating the second rotating rate adjusting device, the rotating rate of the engine may automatically be raised to a predetermined rate, such as the maximum rate, when the drive is transmitted to the accessory. Consequently, only the second rotating rate adjusting device may be operated even when an operational run and a non-operational run are repeated, which simplifies the control operation.

Further, the third rotating rate adjusting device may be connected to a device for adjusting speed of the working vehicle. Then, the rotating rate of the engine may automatically be raised when an operation is made to accelerate the vehicle. With the three rotating rate adjusting devices, the working vehicle offers an option for the simplified control operation, in addition to the functions of the conventional mower.

Further and other objects, features and effects of the invention will become more apparent from the following more detailed description of the embodiments of the invention taken with reference to the accompanying drawings.

DESCRIPTION OF THE PREFERRED EMBODIMENTS

A riding lawn mower to which the present invention is applied will be described with reference to the drawings.

Figure 1:
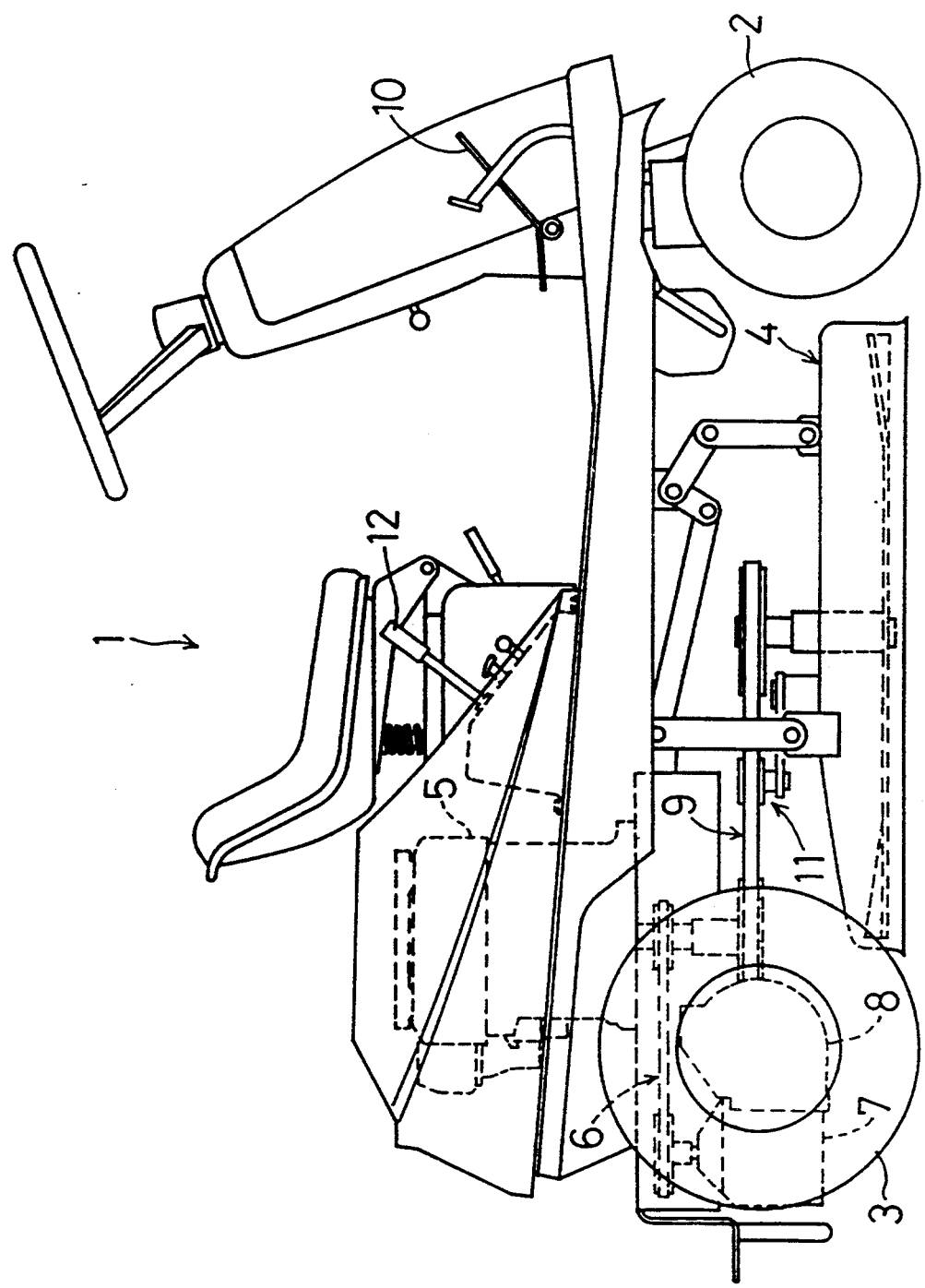
FIG. 1 is a side elevation of a lawn mower having an engine speed control apparatus according to the present invention.

As shown in FIG. 1, the riding lawn mower is the mid-mount type having a vehicle body 1 including front wheels 2, rear wheels 3, and a mower unit 4 underslung between the front and rear wheels 2 and 3. A vertical engine 5 is mounted rear-wardly of the vehicle body 1 to act as drive means. Part of engine output is transmitted to the rear wheels 3 through a transmission belt mechanism 6, a hydrostatic stepless transmission (HST) 7 and a transmission case 8. The remaining pan of engine output is transmitted to the mower unit 4 through a transmission belt mechanism 9. A shift pedal (one example of speed control means) 10 may be depressed forward or backward to cause the hydrostatic stepless transmission 7 acting as propelling speed change means to provide steplessly varied forward or backward speeds. The transmission belt mechanism 9 includes a tension type PTO clutch 11 operable by a clutch lever 12 disposed adjacent a driver's seat.

The present invention is characterized by a control structure for controlling a speed adjuster provided for the engine 5. Several embodiments of the control structure will be described hereinafter.

Figure 2:
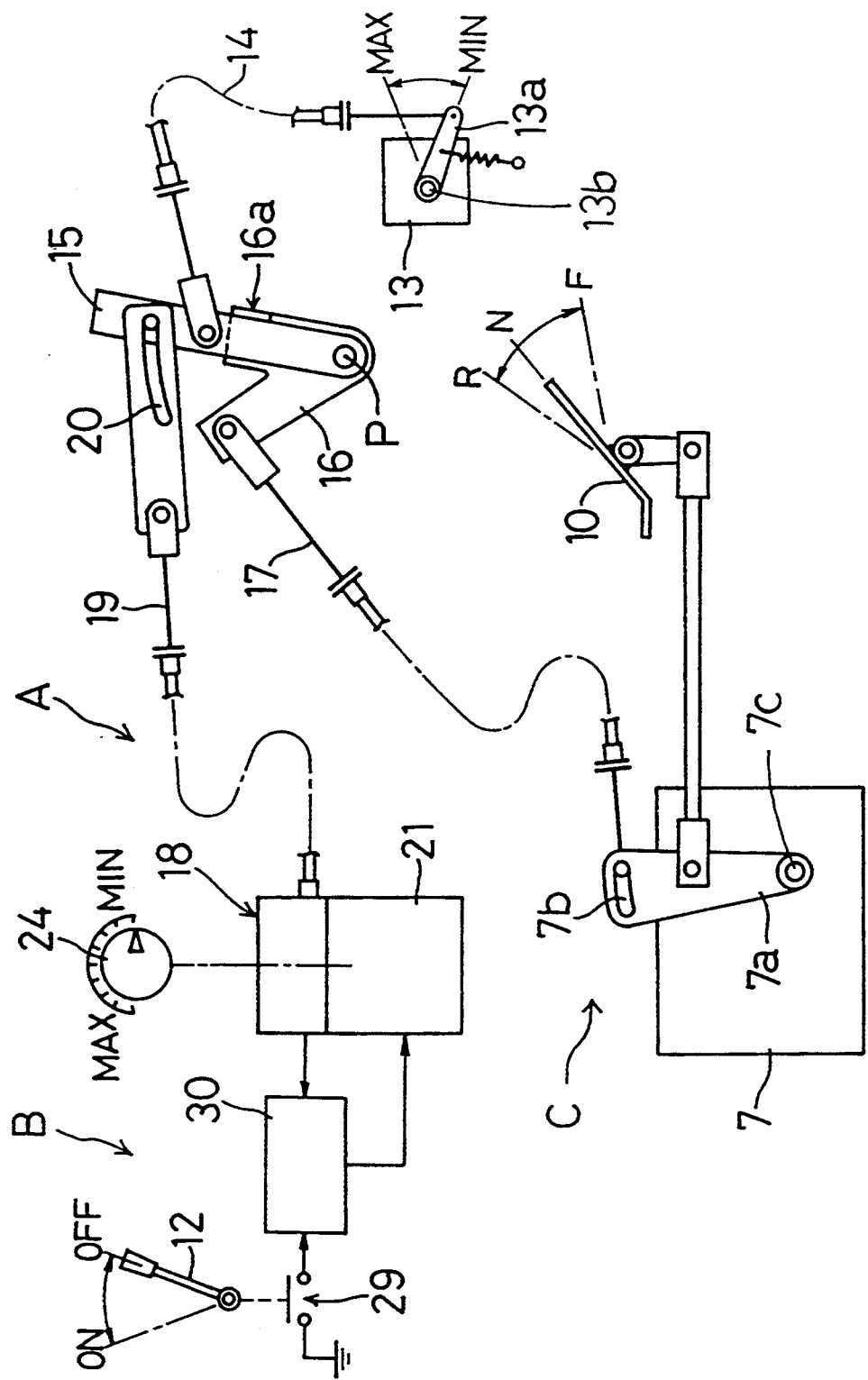
FIG. 2 is a schematic view showing a principal portion of the engine speed control apparatus, in which the rotating rate is set to a minimum level.

Referring to FIG. 2, the engine 5 has a speed adjuster 13 to be adjustable between a minimum rotating rate and a maximum rotating rate. The speed adjuster 13 has an adjuster lever 13a spring-loaded to a minimum rotation position (idling position) MIN. A wire 14 extends from the adjuster lever 13a to a relay arm 15 pivotable about a pivotal point P. A control arm 16 also is pivotable about the pivotal point P independently of the relay arm 15. A wire 17 extending from the relay arm 15 is connected at a forward end thereof to a play accommodating slot 7b formed in a speed control lever 7a pivotable about a shaft 7c of the hydrostatic stepless transmission 7. Only when the shift pedal 10 is depressed in a forward direction F from a neutral position N to swing the speed control lever 7a counterclockwise in FIG. 2, the wire 17 is pulled to swing the control arm 16 counterclockwise. At this time, a contact piece 16a formed on the control arm 16 contacts the relay arm 15 to swing the latter counterclockwise, whereby the wire 14 is pulled to move the adjuster lever 13a in a direction of high rate rotation. When the shift pedal 10 is depressed in a direction of R from the neutral position N, the speed control lever 7a is pushed in the opposite direction but, because of the slot 7b, the adjuster lever 13a remains still. When the speed control lever 7a pivots counterclockwise from neutral, the lawn mower is driven backward.

The relay arm 15 is pin-connected through a play accommodating slot 20 to a wire 19 extending from an accelerative drive mechanism 18. When the accelerative drive mechanism 18 pulls the wire 19 to swing the relay arm 15 counterclockwise, the adjuster lever 13a is operable from the minimum rotation position (idling position) MIN toward a maximum rotation position MAX. The play accommodating slot 20 provides play when the relay arm 15 is operated by the shift pedal 10.

FIGS. 6 through 8A and 8B show details of the accelerative drive mechanism 18.

Figure 6:
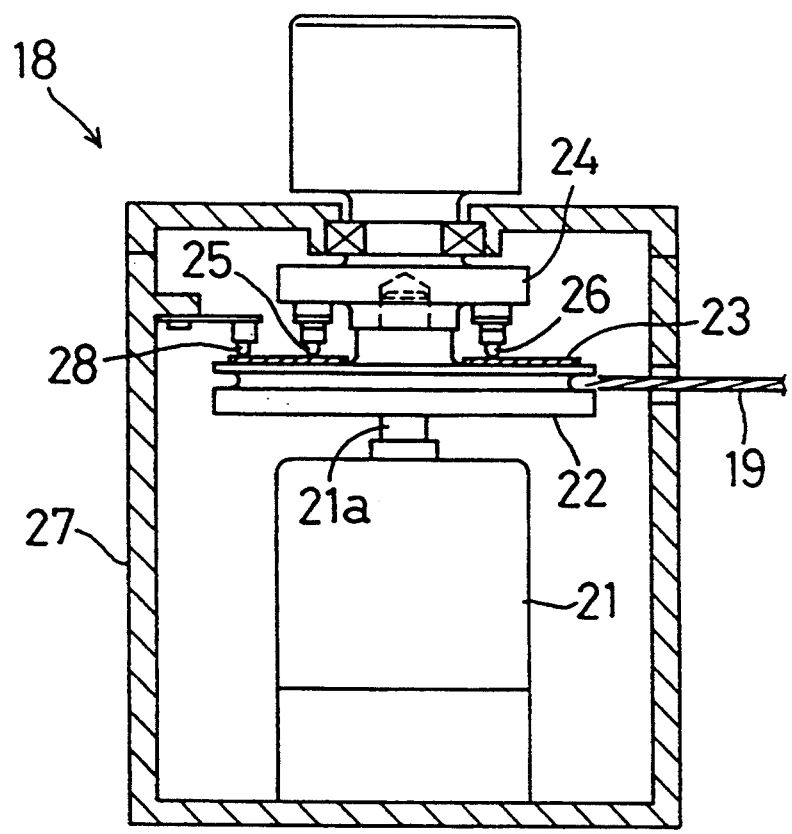
FIG. 6 is a view showing a motor and adjacent components of the accelerative drive mechanism.

In FIG. 6, numeral 21 denotes a reversible electric motor (one example of electric actuators) having a speed reducer and an output shaft 21a. The output shaft 21a is connected to a rotary plate 22 having a movable electrode 23 formed of a copper plate on a surface thereof. The wire 19 is connected to the rotary plate 22. Numeral 24 denotes a rotatable acceleration setter coaxially opposed to the rotary plate 22. The acceleration setter 24 has a pair of contacts 25 and 26 for slidably contacting the movable electrode 23. The acceleration setter 24 is mounted in a case 27 to be rotatable by a manual force imparted from outside. Numeral 28 denotes a contact fixedly supported by the case 27 for slidable contact with the movable electrode 23.

Figure 5:
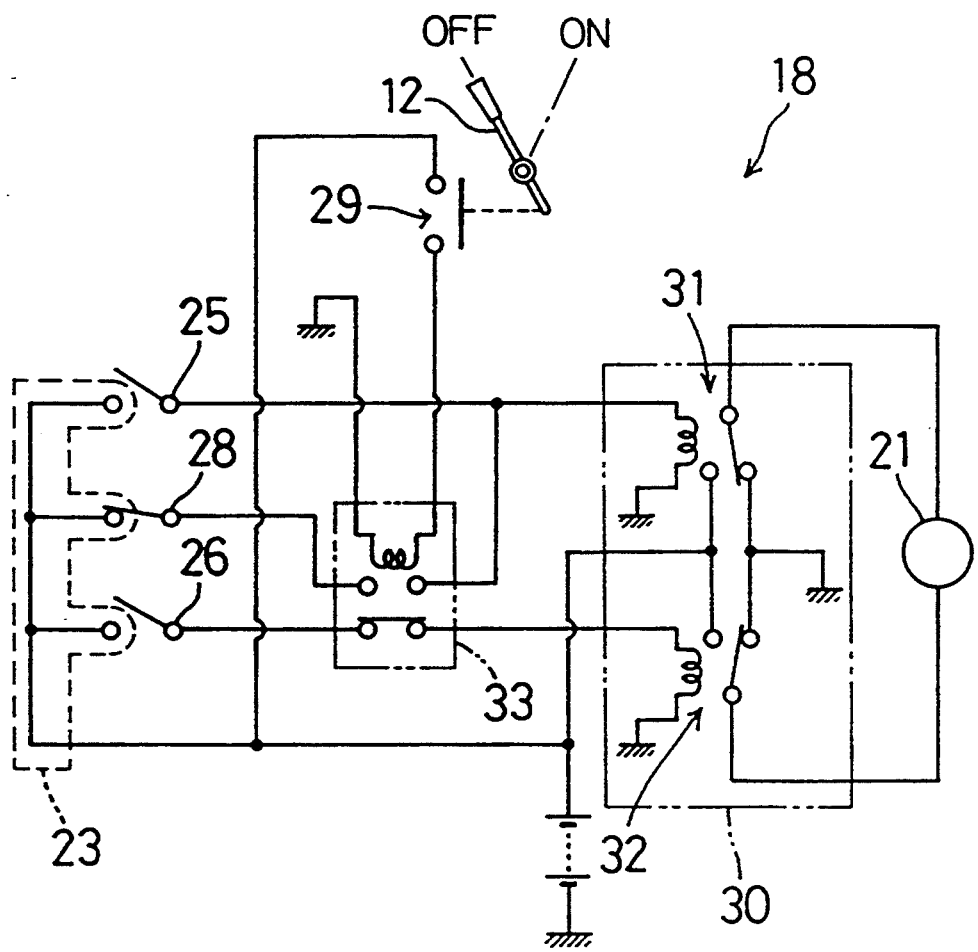
FIG. 5 is a circuit diagram of an accelerative drive mechanism forming a part of the present invention.

A PTO switch 29 is provided to detect a clutch engaging operation of the PTO clutch lever 12. The switch 29, movable electrode 23 and contacts 25, 26 are connected to the electric motor 21 through circuitry shown in FIG. 5. Numeral 30 in FIG. 5 denotes a relay circuit for driving the electric motor 21 in opposite directions, which includes a relay 31 for driving the motor 21 in an accelerating direction, and a relay 32 for driving the motor 21 in a decelerating direction. Numeral 33 denotes a relay for switching a circuit connected to the accelerating relay 31 in response to ON/OFF operations of the PTO switch 29.

Next, operation of the accelerative drive mechanism 18 will be described in detail with reference to FIGS. 7 and 8.

Figure 7:
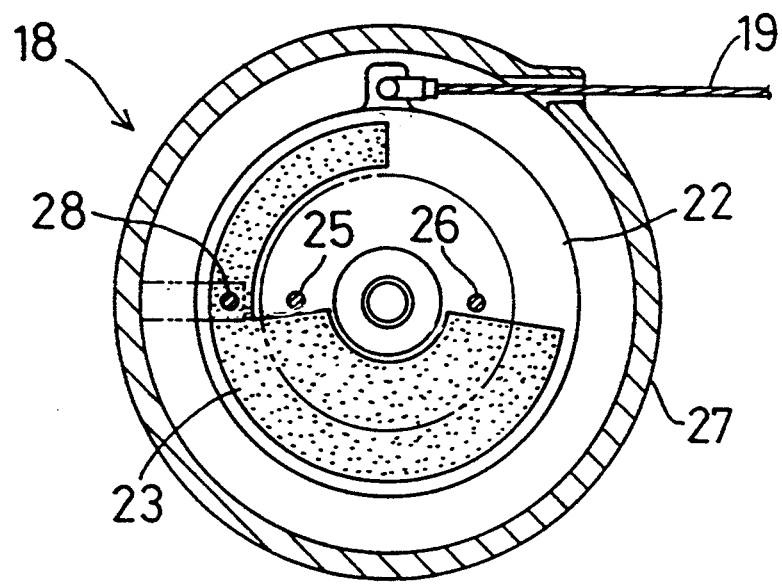
FIG. 7 is a front view showing a positional relationship between a rotary plate and an electrode for contacting the rotary plate.

FIG. 7 shows the acceleration setter 24 in a minimum rotation position (idling position) MIN, and the rotary plate 22 also in a minimum rotation position. In this state, the contacts 25 and 26 are both out of contact with the movable electrode 23, and the accelerating and decelerating relays 31 and 32 are both turned off. The contact 28 is in contact with the movable electrode 23.

Figure 3:
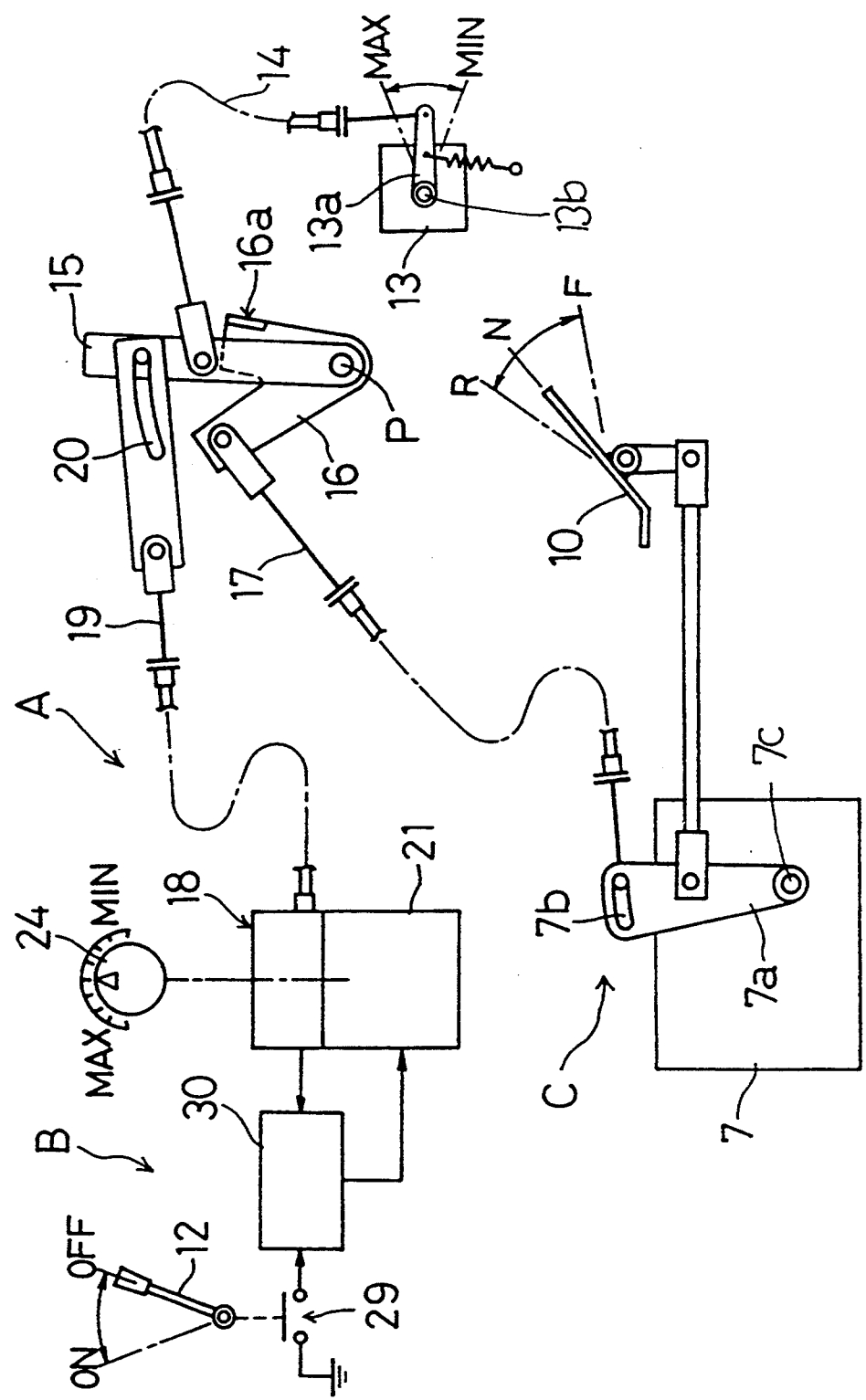
FIG. 3 is a schematic view similar to FIG. 2, in which the rotating rate is set to an intermediate level.
Figure 8A:
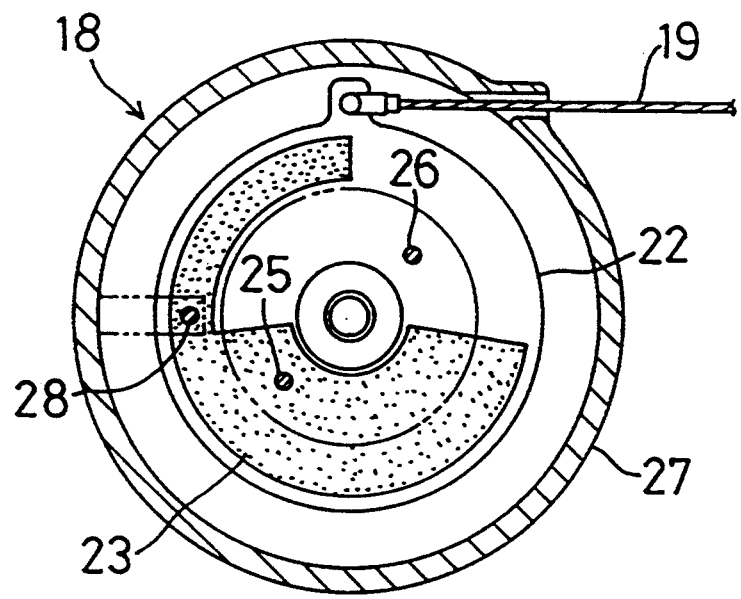
FIGS. 8A and 8B are views showing positional relationships between the rotary plate and electrode when the accelerative drive mechanism is operated.
Figure 8B:
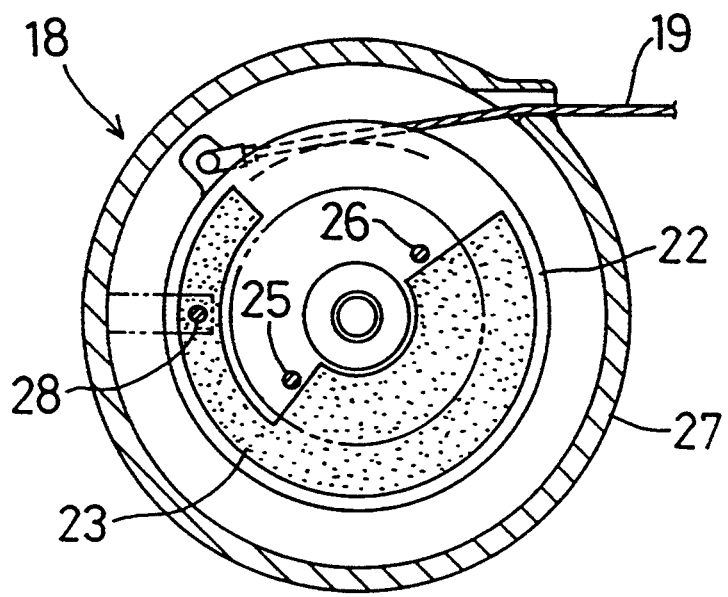

When the PTO clutch lever 12 is in a declutching position (with the PTO switch 29 turned off) and the acceleration setter 24 is rotated counterclockwise for acceleration as shown in FIG. 8, only the contact 25 on the acceleration setter 24 moves into contact with the movable electrode 23. This operates the relay 31 to cause the electric motor 21 to rotate the rotary plate 22 counterclockwise. The electric motor 21 is driven until the movable electrode 23 moves out of contact with the contact 25 as shown in FIG. 8B. With the counterclockwise rotation of the rotary plate 22, a pulling force of the wire 19 is transmitted through the relay arm 15 and wire 14 to the adjuster lever 13a. Consequently, as shown in FIG. 3, the speed adjuster 13 is operated in the accelerating direction by an amount corresponding to an amount of operation of the acceleration setter 24.

When the acceleration setter 24 is rotated clockwise for deceleration from the rotating rate setting state noted above, only the contact 26 on the acceleration setter 24 contacts the movable electrode 23. As a result, the relay 32 is operated to cause the electric motor 21 to rotate the rotary plate 22 clockwise. The electric motor 21 is driven until the movable electrode 23 moves out of contact with the contact 26. With the clockwise rotation of the rotary plate 22, the wire 19 is returned to allow the adjuster lever 13a to return in the decelerating direction under the spring load. Thus, a first rotating rate adjusting device A is provided which sets the adjuster lever 13a of the speed adjuster 13 to a selected basic rotating rate in the range from the minimum rotation position (idling position) MIN to the maximum rotation position MAX, in response to an amount of rotation of the acceleration setter 24.

Figure 4:
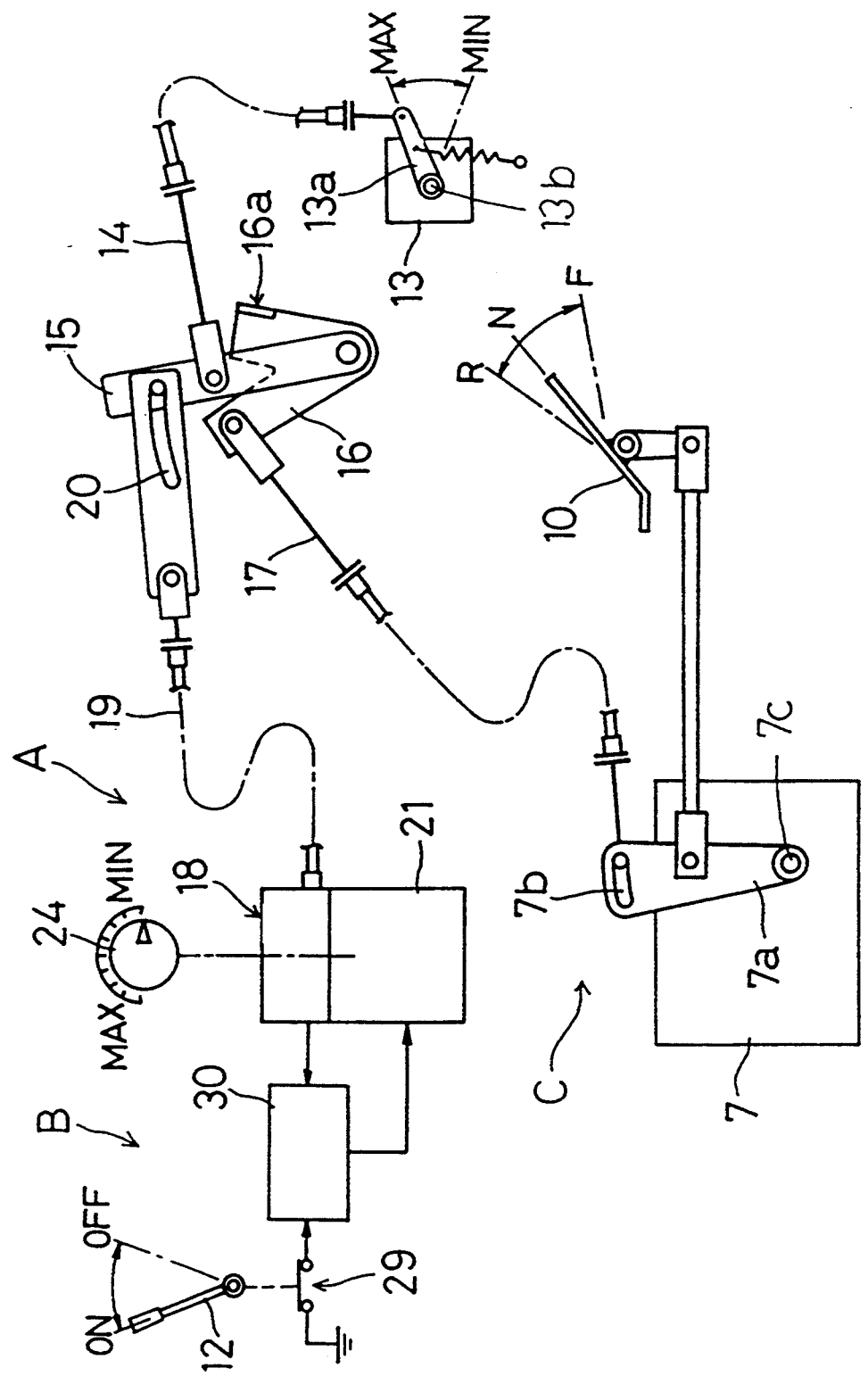
FIG. 4 is a schematic view similar to FIG. 2, in which rotating rate is set to a maximum level.

When the PTO clutch lever 12 is operated to a clutch engaging position, the PTO switch 29 is turned on to switch the circuit connected to the accelerating relay 31 to the contact 28. Since the contact 28 is already in contact with the movable electrode 23, the relay 31 is operated to cause the electric motor 21 to rotate the rotary plate 22 counterclockwise. The electric motor 21 is driven until the movable electrode 23 moves out of contact with the contact 28. The counterclockwise rotation of the rotary plate 22 is transmitted through the wire 19, relay arm 15 and wire 14 to the adjuster lever 13a. Consequently, as shown in FIG. 4, the speed adjuster 13 is set to the maximum rotation position MAX.

Thus, a second rotating rate adjusting device B is provided which is responsive to a clutch engaging operation of the PTO clutch lever 12 to set the speed adjuster 13, for example, to the maximum rotation position MAX, overriding the basic rotating rate provided by the first rotating rate adjusting device A.

The shift pedal 10 may be depressed forward when, as shown in FIG. 2, the PTO clutch is disengaged and the rotating rate is set by the first rotating rate adjusting device A to the minimum rotating rate. Then, the operating force is transmitted through the wire 17, relay arm 15 and wire 14 to operate the speed adjuster 13 in the accelerating direction. If the rotating rate is set by the first rotating rate adjusting device A to an intermediate rotating rate as shown in FIG. 3, the speed adjuster 13 is not operable by the forward depression of the shift pedal 10 until the contact piece 16a of the control arm 16 contacts the relay arm 15. A further depression of the shift pedal 10 will actuate the relay arm 15 through the contact piece 16a of the control arm 16 to effect acceleration.

Thus, a third rotating rate adjusting device C is provided which operates the speed adjuster 13 in the accelerating direction when the shift pedal 10 is further depressed forward in a high speed range having, as a lower limit, the rotating rate set by the first rotating rate adjusting device A.

In the above embodiment, the speed adjuster 13 is set, with priority, to the maximum rotation position MAX by the second rotating rate adjusting device B. Where the contact 28 is adapted relocatable, the speed adjuster 13 may be set, with priority, to a selected high rotating rate position lower than the maximum rotation position MAX in response to engagement of the PTO clutch. This will be effective for a low load operational run.

A maximum rotating rate adjusting device 34 for relocating the contact 28 will be described next.

Figure 9:
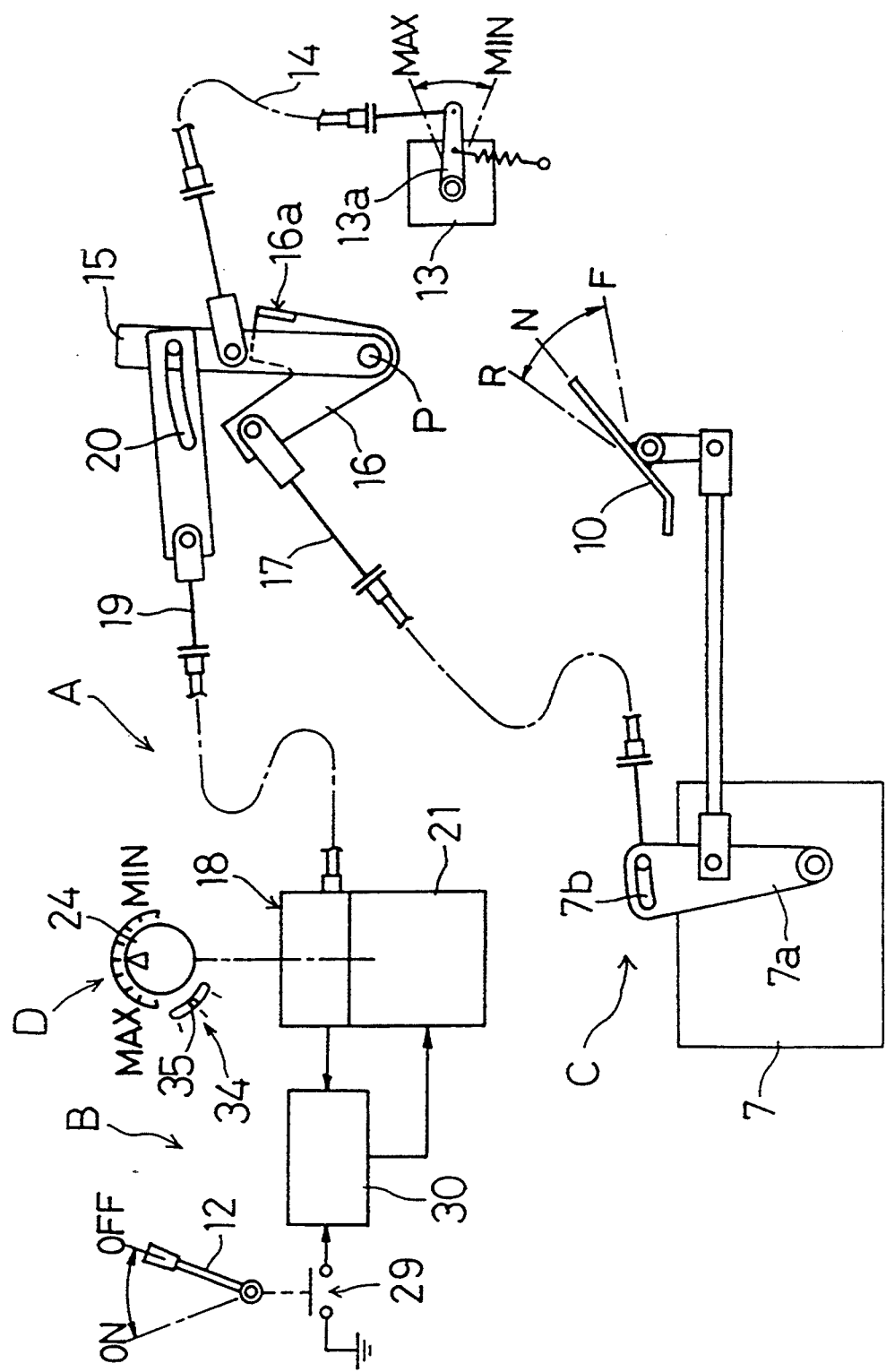
FIG. 9 is a schematic view showing a control apparatus having a maximum rotating rate adjusting device according to the present invention.
Figure 10:
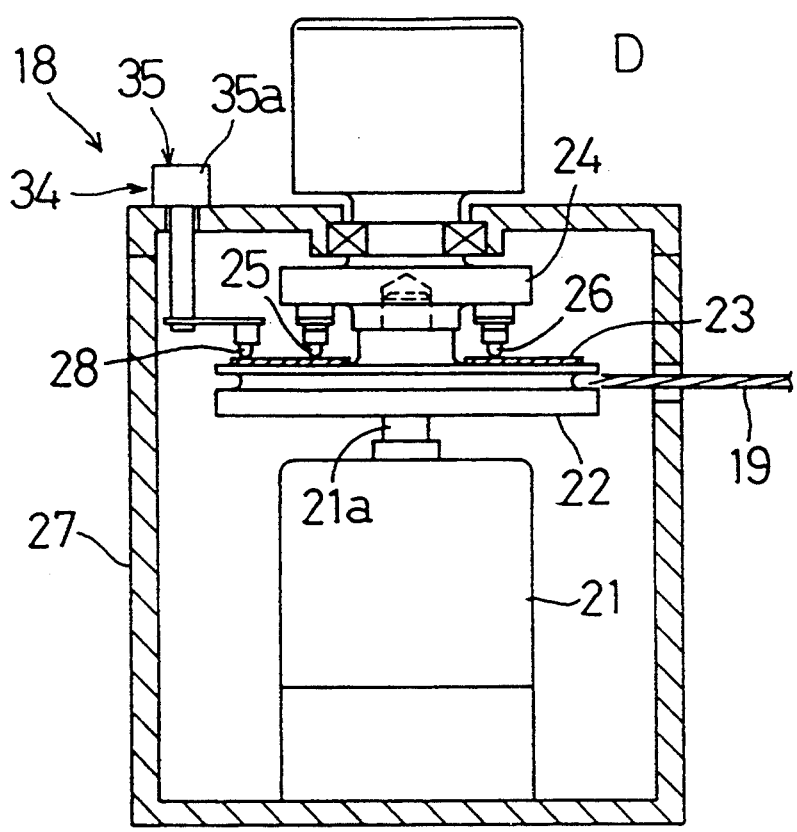
FIG. 10 is a view showing a motor and adjacent components of an accelerative drive mechanism with the maximum rotating rate adjusting device.
Figure 11:
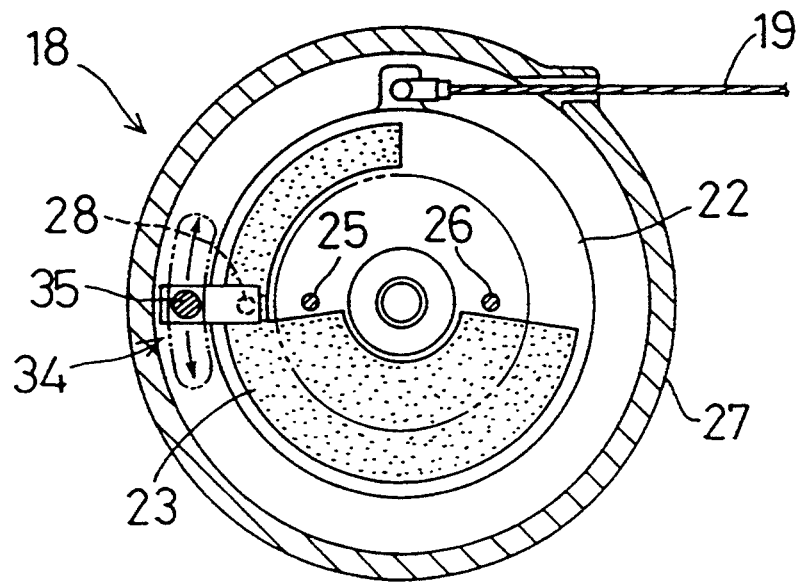
FIG. 11 is a view showing a rotary plate of the accelerative drive mechanism with the maximum rotating rate adjusting device.

As shown in FIGS. 9 through 11, the maximum rotating rate adjusting device 34 allows a fixable contact 28 to move circumferentially about the output shaft 21a to be fixed to a selected position. For this purpose, the maximum rotating rate adjusting device 34 includes a support member 35 for supporting the fixable contact 28, which is slidable about the output shaft 21a relative to the case 27 and frictionally retainable in a selected position. The support member 35 has a control knob 35a exposed outwardly of the case 27 to be manually slidable.

With the above construction, the fixable contact 28 is relocatable about the output shaft 21a, whereby the electrode 23 moves out of contact with the fixable contact 28 in a varied position in the direction of rotation of the electric motor 21. Consequently, a limit position for pulling the wire 19 is also varied, which in turn varies the maximum rotation position MAX of the adjuster lever 13a dependent on the position of the fixable contact 28. When, for example, the engine 5 produces a loud, unpleasant noise during a grass cutting operation, the maximum rotating rate of the engine 5 may be lowered to diminish the noise. Further, the engine 5 may be set, in advance, to a maximum rotating rate for providing power necessary to a grass cutting operation and yet producing a low level of noise. By reserving power in this way, it is possible to avoid an unduly low rotating rate of the engine 5 occurring with a slight overload of operation.

The speed adjuster 13 may suitably be a governor where the engine 5 is a diesel engine as in the foregoing embodiment, and a throttle valve in the case of a gasoline engine. The maximum rotating rate adjusting device may be mechanically operable as in the foregoing embodiment, or may be electrically operable.

Figure 12:
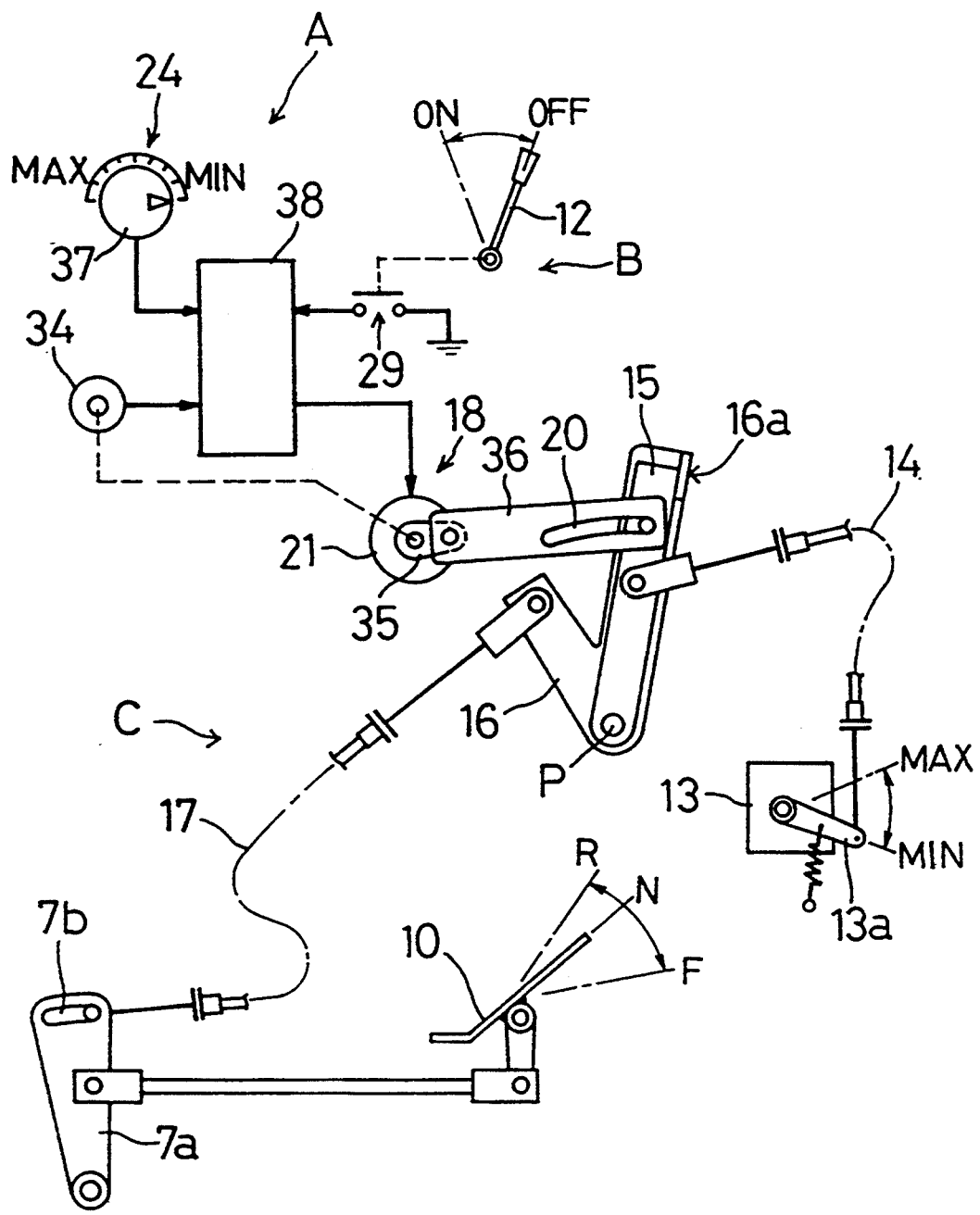
FIG. 12 is a schematic view of an engine speed control apparatus in a second embodiment of the invention.

FIG. 12 shows a second embodiment of the present invention.

This embodiment is basically the same as the first embodiment, but the first rotating rate adjusting device A and second rotating rate adjusting device B are modified as follows. The accelerative drive mechanism 18 includes an electric motor 21 having a feedback potentiometer 34. A crank arm 35 rotatable by the electric motor 21 is connected to the relay arm 15 through a link 36 defining a play accommodating slot 20. The acceleration setter 24 is in the form of a potentiometer 37 connected, along with the potentiometer 34, to a motor drive circuit 38. Thus, the crank arm 35 is rotatable through an angle proportional to an amount of operation of the potentiometer 37. The first rotating rate adjusting device A is provided to set the speed adjuster 13 to rotating rates through the entire range from the minimum rotation position (idling position) MIN to the maximum rotation position MAX with rotation through about 180 degrees of the crank arm 35.

The second rotating rate adjusting device B is operable such that, when the PTO switch 29 is turned on, an acceleration setting signal corresponding to the maximum rotation is applied to the motor drive circuit 38 in place of the acceleration setting signal from the potentiometer 37, to rotate the crank arm 35 to a maximum extent, thereby setting the speed adjuster 13, with priority, to the maximum rotation position MAX.

The third rotating rate adjusting device C is the same as in the first embodiment.

In this embodiment also, the acceleration setting signal applied when the PTO switch 29 is turned on may be adapted adjustable stepwise or steplessly to enable selection of a priority rotation position set by the second rotating rate adjusting device B. Further, the third rotating rate adjusting device C may include a potentiometer for detecting an amount of forward depression of the shift pedal 10 and inputting a rotating rate setting signal based thereon to the motor drive circuit 38. Then, a rotating rate may be set by driving the electric motor 21 based on the greater of the setting signal from the potentiometer of the third rotating rate adjusting device C and the setting signal from the potentiometer 37 of the first rotating rate adjusting device A. Where an amount of forward depression of the shift pedal 10 is detected by a potentiometer as above, this potentiometer may be adapted to output a nonlinear signal based on the amount of forward depression of the shift pedal 10.

This enables selection of acceleration characteristics of the depression of the shift pedal 10. For example, a small amount of acceleration may be effected relative to an amount of pedal depression in a low forward speed range, and a large amount of acceleration relative to an amount of pedal depression in a high forward speed range.

Figure 13:
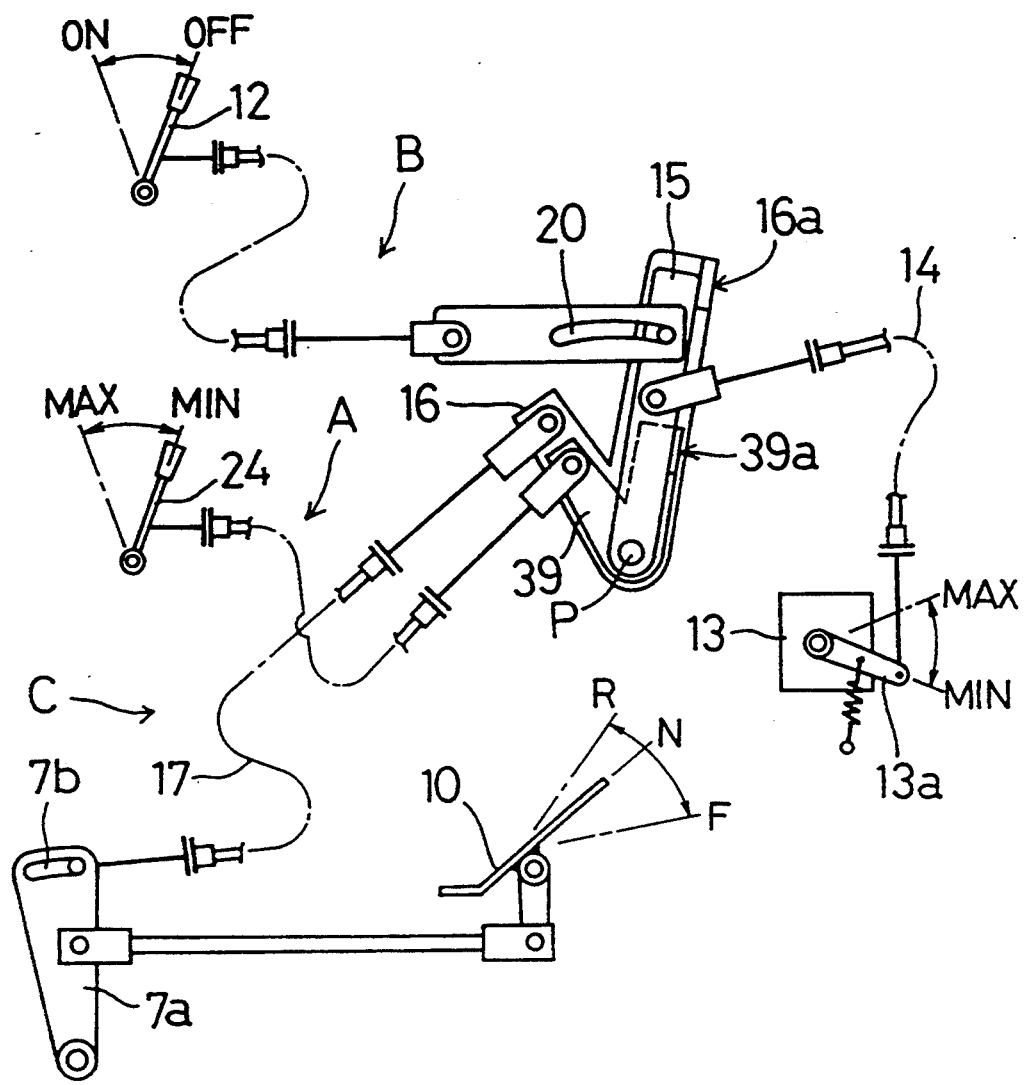
FIG. 13 is a schematic view of an engine speed control apparatus in a third embodiment of the invention.

FIG. 13 shows a third embodiment of the present invention.

All the functions of the preceding embodiments are mechanized in this embodiment.

The first rotating rate adjusting device A includes an acceleration setter (hand accelerator lever) 24 for causing a control arm 39 to pivot about the pivotal point P. As a result, a contact piece 39a formed on the control arm 39 contacts the relay arm 15 and operates the latter in the accelerating direction. The second rotating rate adjusting device B causes the PTO clutch lever 12 to operate the relay arm 15 directly to the maximum rotation position MAX. The third rotating rate adjusting device C, as in the preceding embodiments, causes the control arm 39 to pivot and push, with the contact piece 16a, the relay arm 15 in the accelerating direction.

In each of the embodiments described hereinbefore, the propelling change speed device is not limited to the hydrostatic stepless transmission, and may be operable by a lever instead of the pedal. In the first and second embodiments, the electric actuator may comprise an electromagnetic solenoid having a plunger movable in proportion to an excitation signal. The high rotating rate set by the second rotating rate adjusting device B in response to the clutch engaging operation of the PTO clutch lever 12 may be automatically canceled by raising of the mower unit 4. This assures safety in that engine rotation is automatically lowered when the mower unit 4 is raised with the PTO clutch lever 12 remaining in the clutch engaging position.

A further embodiment of the present invention will be described with reference to FIGS. 14 through 16.

As in the preceding embodiments, the hydrostatic stepless transmission 7 is connected to the shift pedal 10. When the shift pedal 10 is depressed forward, the transmission 7 provides forward acceleration. When the pedal 10 is depressed backward, the transmission 7 provides stepless backward speed variations. The transmission belt mechanism 9 includes the tension type PTO clutch 11 operable by the PTO clutch lever 12 disposed adjacent the driver's seat.

Figure 14:
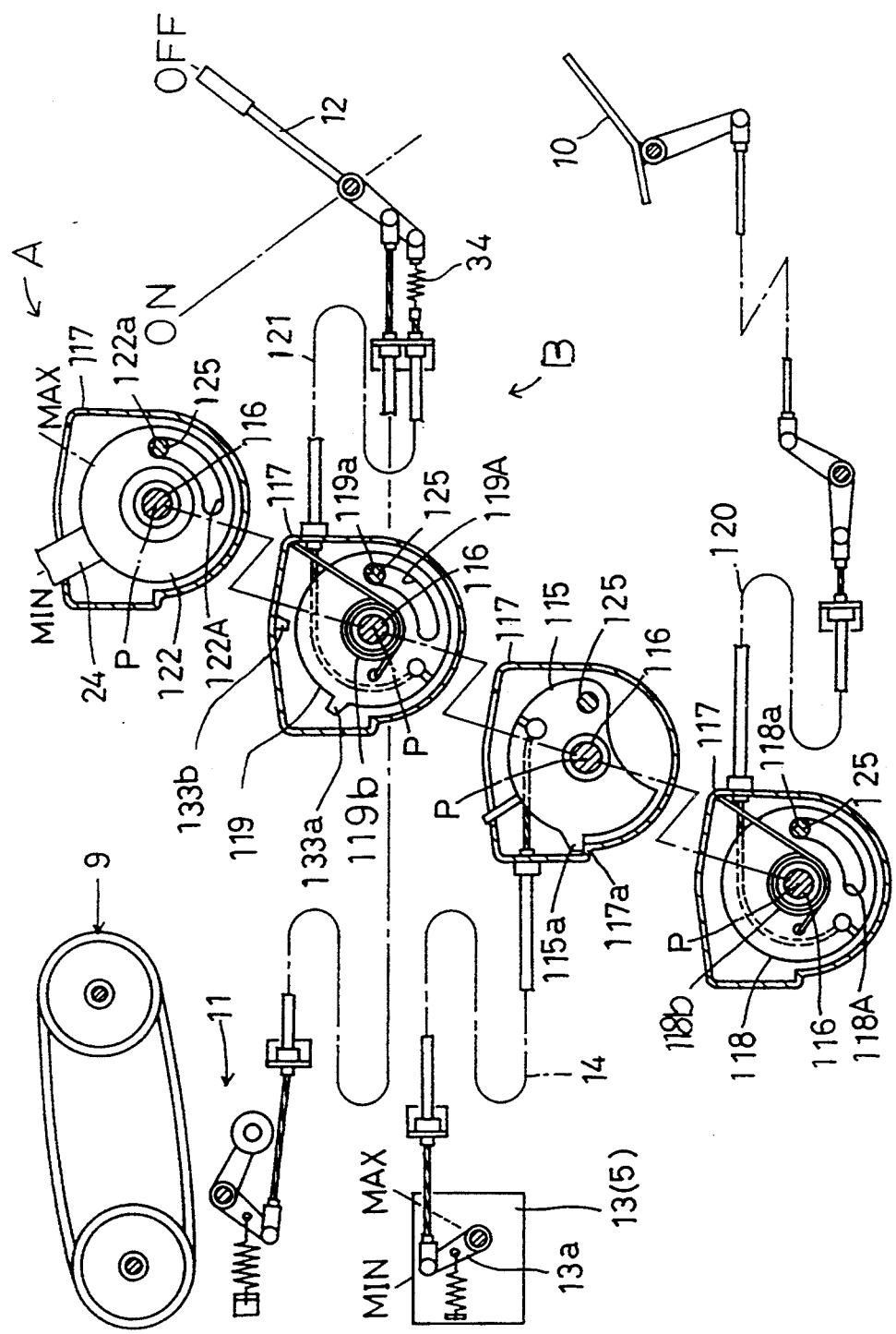
FIG. 14 is a schematic view of an engine speed control apparatus in a further embodiment of the invention.
Figure 15:
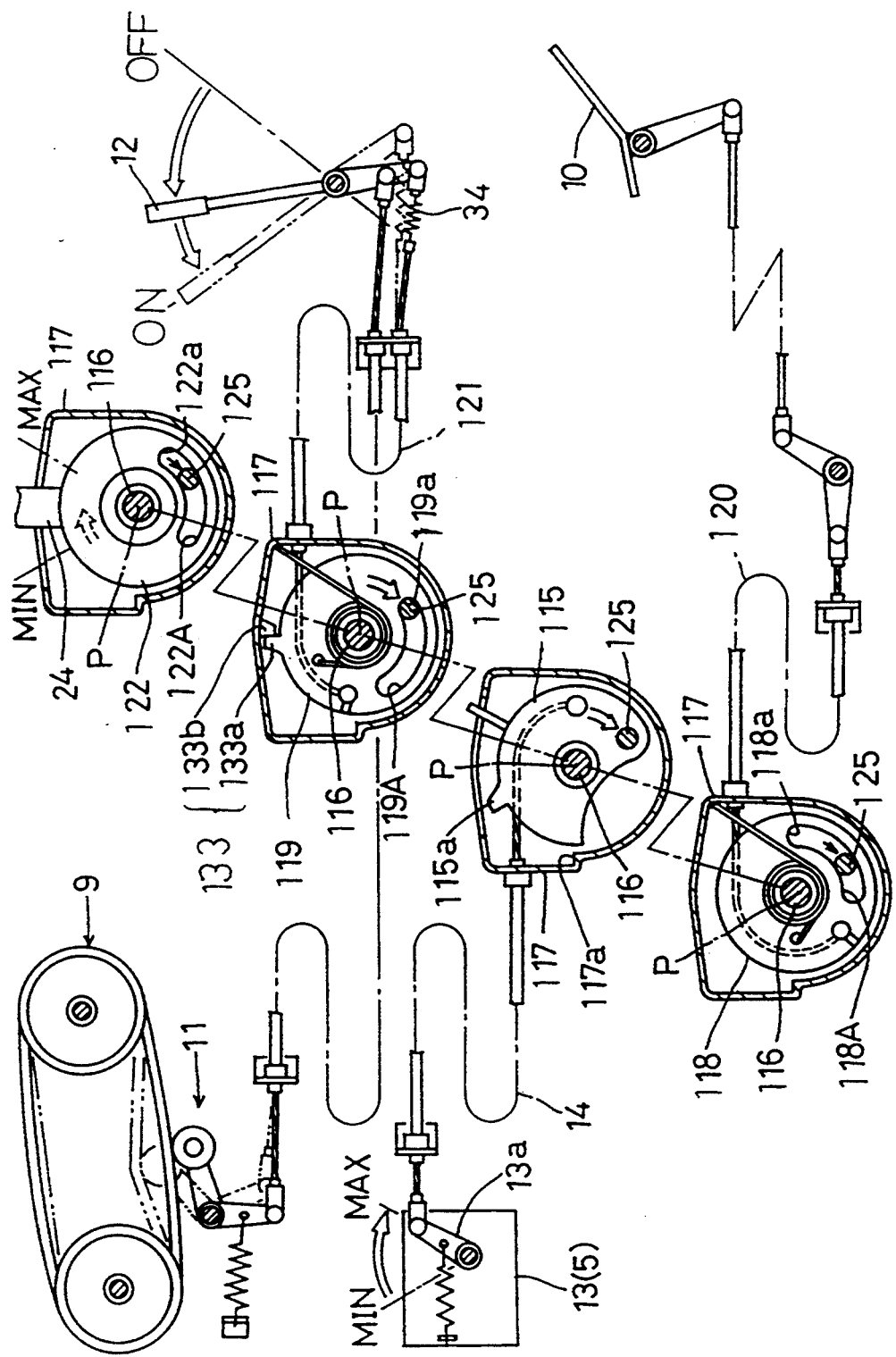
FIG. 15 is a schematic view of the control apparatus of FIG. 14 in action.
Figure 16:
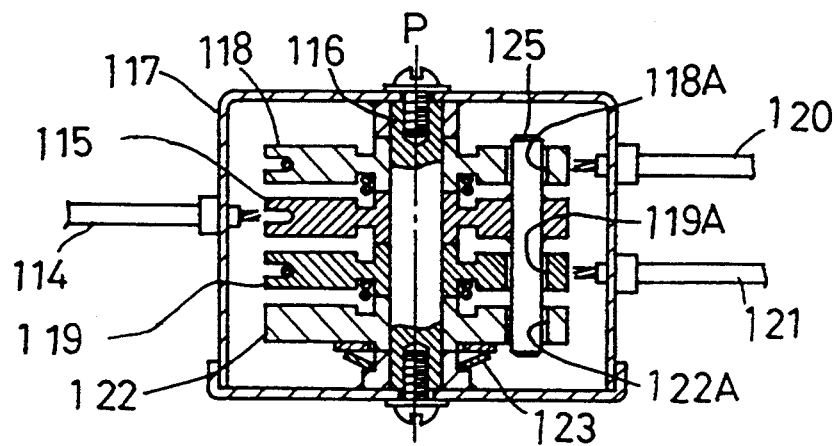
FIG. 16 is a sectional view of a principal portion of the control apparatus shown in FIGS. 14 and 15.

As shown in FIGS. 14 through 16, the adjuster lever 13a of the speed adjuster 13 provided for the engine 5 is biased to the minimum rotation position (idling position) MIN. The wire 14 extending from the adjuster lever 13a is connected to a main rotary member 115 rotatable about an axis P. The main rotary member 115 is mounted on a support shaft 116 contained in a support case 117 formed of sheet metal and attached to the vehicle body 1. The main rotary member 115 has an engaging portion 115a for engaging a step 117 formed in the support case 117, whereby the main rotary member 115 is stopped at a position corresponding to the minimum rotation position MIN. The main rotary member 115 is flanked at opposite sides thereof by a third rotary member 118 and a second rotary member 119 acting as an interlock member, both mounted on the support shaft 116 to be rotatable about the axis P. The third rotary member 118 is connected to a wire 120 extending from the shift pedal 10 and biased to neutral. The second rotary member 119 is connected to a wire 121 extending from the PTO clutch lever 12 and biased to an OFF position. The second rotary member 119 is flanked at the side facing away from the main rotary member 115 by a first rotary member 116 mounted on the support shaft 116 to be rotatable about the axis P. The first rotary member 122 is frictionally retainable by pressure contact with the support case 117 through a belleville spring 123. A hand accelerator lever 24 acting as the acceleration setter is rigidly connected to the first rotary member 122.

As shown in FIG. 14, the first rotary member 122 is disk-shaped and defines an arcuate slot 122A adjacent a peripheral edge thereof. This first rotary member 122 and the hand accelerator lever 24 rotatable therewith constitute a first rotating rate adjusting device A. The second rotary member 119 also is disk-shaped and defines an arcuate slot 119A adjacent a peripheral edge thereof. This second rotary member 119 and the PTO clutch lever 12 for operating the second rotary member 119 constitute a second rotating rate adjusting device B. The third rotary member 118 also is disk-shaped and defines an arcuate slot 118A adjacent a peripheral edge thereof. This third rotary member 118 and the shift pedal 10 connected thereto through the wire 120 constitute a third rotating rate adjusting device C.

As shown in FIG. 16, a pin 125 acting as a control element extends parallel to the axis P through a position of the main rotary member 115 opposed to the engaging portion 115a across the support shaft 116. The pin 125 extends through the slots 122A, 119A and 118A formed in the first rotary member 122, second rotary member 119 and third rotary member 118, respectively. These slots 122A, 119A and 118A are formed arcuate about the axis P to provide play for allowing movement of the pin 125 in a direction to accelerate the main rotary member 115. The slots 122A, 119A and 118A have contact portions 122a, 119a and 118a at respective upstream ends thereof with respect to the direction of acceleration. The contact portion 122a of the first rotary member 122 pushes the pin 125 to a control position selected by operation of the hand accelerator lever 24 when the PTO clutch lever 12 is in an OFF position and the shift pedal 10 is in neutral. As a result, the main rotary member 115 is rotated to and frictionally held in position by the belleville spring 23, to set the adjuster lever 13a to a selected position. The contact portion 119a, when the PTO clutch lever 12 is in the OFF position, is contactable with the pin 125 when the main rotary member 115 is in the minimum rotation position MIN. When the PTO clutch lever 12 is operated to an ON position, the second rotary member 119 is rotated against a spring 119b exerting a biasing force toward an OFF position, to push the pin 125 placed in an intermediate position in the slot 119A by the hand accelerator lever 24, thereby to rotate the main rotary member 115 to a maximum rotation position MAX. On the other hand, the contact portion 118a, when the PTO clutch lever 12 is in neutral, is contactable with the pin 125 when the main rotary member 115 is in the minimum rotation position MIN. When the shift pedal 10 is depressed for forward acceleration, the adjuster lever 13a is not operated before the contact portion 118a contacts the pin 125. After the contact portion 118a contacts the pin 125, the main rotary member 115 is rotated in the accelerating direction from the position set by the hand accelerator lever 24. At this time, the third rotary member 118 is rotated against a spring 118b exerting a biasing force toward the minimum speed position. When the shift pedal 10 is operated to the maximum speed position, the adjuster lever 13a also is operated to the maximum rotation position MAX.

As shown in FIGS. 14 and 15, a limiting device 133 is provided to prevent the second rotary member 119 from rotating further from the maximum rotation position MAX when the main rotary member 115 is in the maximum rotation position MAX. The limiting device 133 includes a projection 133a formed on the second rotary member 119 and a limiting piece 133b projecting from an inner wall of the support case 117 for contacting the projection 133a. A tension spring 34 is interposed between the wire 121 and PTO clutch lever 12 to act as a play accommodating element.

With the above construction, when the PTO clutch lever 12 is operated from the OFF position toward the ON position, the operating force is transmitted through the tension-spring 34 and wire 121 to rotate the second rotary member 119. As a result, the pin 125 is pushed by the contact portion 119a of the slot 119A to rotate the main rotary member 115 in the accelerating direction. With this rotation, the adjuster lever 13a is operated through the wire 14 to pivot in the accelerating direction. When the adjuster lever 13a is operated to the maximum rotation position MAX, the second rotary member 119 is prevented from rotating in the accelerating direction by the contact between the projection 133a and limiting piece 133b of the limiting device 133. In this state, the PTO clutch 11 remains unengaged. From this state, the PTO clutch lever 12 is operable to the clutch engaging position, stretching the tension spring 34, to engage the PTO clutch 11. The PTO clutch lever 12 is retained in the clutch engaging position by a frictional retaining mechanism or the like, not shown, against the biasing force of the tension spring 34. With the PTO clutch lever 12 retained in the clutch engaging position, the tension spring 34 retains the second rotary member 119 in the position locked by the limiting device 133. The main rotary member 115 also is held immovable to maintain the adjuster lever 13a in the maximum rotation position MAX.

Figure 17:
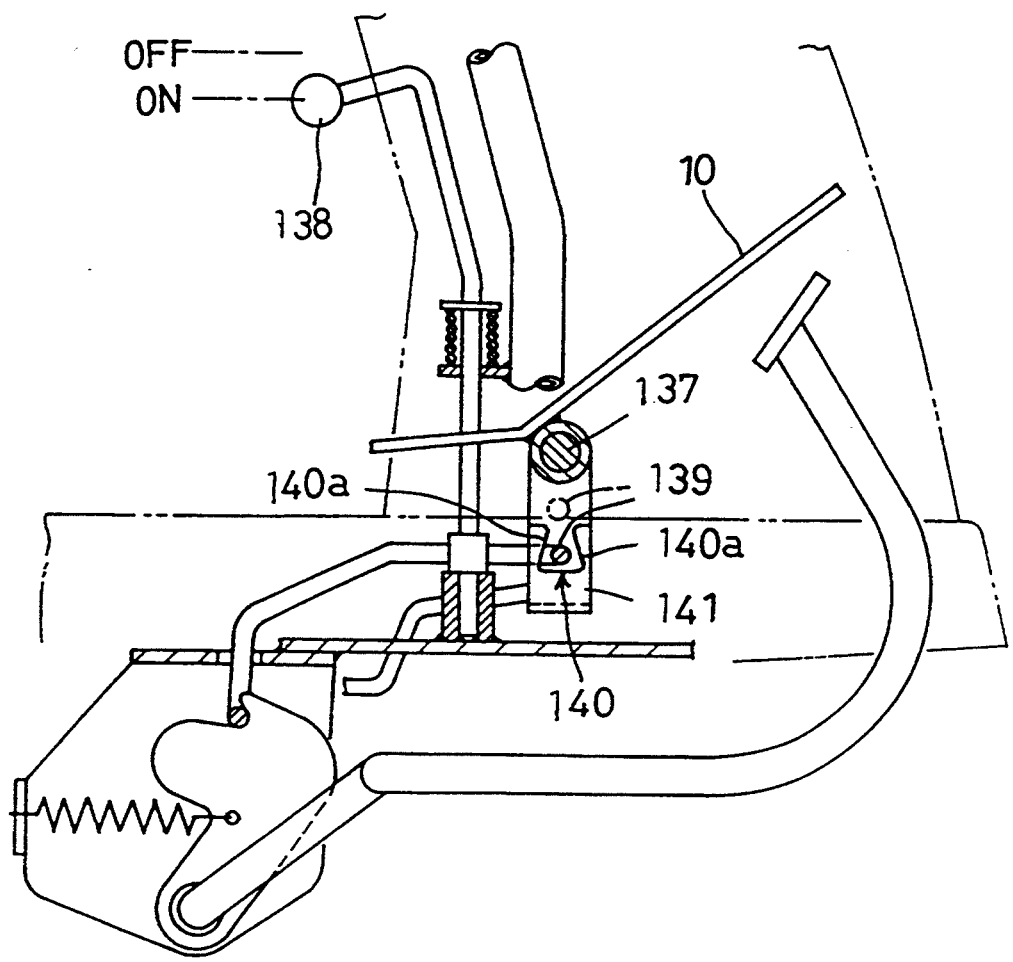
FIG. 17 is a view showing a lock mechanism provided adjacent a pedal of a working vehicle.

A lock structure for locking a parking brake in an operative position will be described briefly next. As shown in FIG. 17, a locking plate 141 is fixed to a pedal shaft 137 interlocked to the shift pedal 10 for operating the hydrostatic stepless transmission 7. The locking plate 141 defines a cutout 140 for receiving a rod 138 interlocked to a parking brake lever 138. The rod 139 is placed in the cutout 140 when the parking brake lever 138 is operated to apply a parking brake. The rod 139 is withdrawn from the cutout 140 when the parking brake lever 138 is operated to a position to release the parking brake. The cutout 140 has side walls 140a inclined to converge progressively from a deep end to an opening. Thus, even when the shift pedal 10 is operated with the parking brake in operation, the side walls 140a of the cutout 140 contact the rod 139 and retain the latter in the cutout 140.

What is claimed is:

1. A rotating rate control apparatus for adjusting rotation of an engine of a working vehicle between a minimum rate and a maximum rate, comprising:
   a first rotating rate adjusting means for establishing a basic rotating rate of said engine within the range of said minimum rate and said maximum rate;
   a second rotating rate adjusting means shiftable between an ON position and an OFF position, said second rotating rate adjusting means being operable, when in said ON position, to set said engine to a predetermined rotating rate between said minimum rate and said maximum rate inclusive; and
   a third rotating rate adjusting means operable, when said second rotating rate adjusting means is in said OFF position, to adjust the rotating rate of said engine between said basic rotating rate established by said first rotating rate adjusting means and said maximum rate.

2. A rotating rate control apparatus as defined in claim 1, wherein said second rotating rate adjusting means is operable, when in said ON position, to actuate drive transmission means for transmitting drive from said engine to an accessory of said working vehicle.

3. A rotating rate control apparatus as defined in claim 2, wherein said accessory is a mower unit.

4. A rotating rate control apparatus as defined in claim 1, wherein said predetermined rotating rate is said maximum rate.

5. A rotating rate control apparatus as defined in claim 1, wherein said working vehicle has a hydrostatic stepless transmission, said third rotating rate adjusting means being operable to control said hydrostatic stepless transmission for acceleration and deceleration.

6. A rotating rate control apparatus as defined in claim 1, wherein said engine includes a speed adjusting arm, and a main pivotable member connected to said speed adjusting arm to be pivotable about a main pivotal axis and having engaging means for engaging with said first, second and third rotating rate adjusting means.

7. A rotating rate control apparatus as defined in claim 6, wherein said speed adjusting arm and said main pivotable member are connected to each other through a wire, said speed adjusting arm being spring-loaded in a direction to provide said minimum rate.

8. A rotating rate control apparatus as defined in claim 6, wherein said first, second and third rotating rate adjusting means include a first, a second and a third pivotable members pivotable about a first, a second and a third pivotal axes, and a first, a second and a third control means for controlling said first, second and third pivotable member, respectively, each of said first, second and third pivotable members having engageable means for engagement with said engaging means of said main pivotable member.

9. A rotating rate control apparatus as defined in claim 8, wherein said main pivotal axis and said first, second and third pivotal axes are formed integral with one another.

10. A rotating rate control apparatus as defined in claim 8, wherein said engaging means comprises a projection fixed to said main pivotable member, and said engageable means comprises a bore engaged with said projection.

11. A rotating rate control apparatus as defined in claim 8, wherein each of said first, second and third pivotable members has a disk-shaped overall configuration, said engageable means being in form of an arcuate slot.

12. A rotating rate control apparatus as defined in claim 11, wherein said first control means comprises a handle bar extending radially of said first pivotable member and revolvable with said first pivotable member.

13. A rotating rate control apparatus as defined in claim 8, wherein said second control means comprises a handle lever connected to said second pivotable member through a wire and pivotable about a support axis.

14. A rotating rate control apparatus as defined in claim 8, wherein said third control means comprises a pedal connected to said third pivotable member.

15. A rotating rate control apparatus as defined in claim 14, wherein said third pivotable member and said pedal are interconnected through a wire.

16. A rotating rate control apparatus as defined in claim 8, wherein said second and third pivotable members are spring-loaded toward said OFF position and in a direction to provide said minimum rate, respectively.

17. A rotating rate control apparatus as defined in claim 8, wherein said first rotating rate adjusting means is operable to exert a frictional force to retain said first pivotable member at said basic rotating rate.

18. A rotating rate control apparatus as defined in claim 8, wherein each of said main pivotable member and said second pivotable member includes a limiting projection to limit pivotal movement thereof.

19. A rotating rate control apparatus as defined in claim 1, wherein said first rotating rate adjusting means further includes maximum rate adjusting means for varying said maximum rate.

* * * * *